United States Patent [19]

Ciulla

[11] 4,258,065

[45] Mar. 24, 1981

[54] MATERIAL FOR COATING BAIT

[76] Inventor: Stephen B. Ciulla, 21 MacKenzie Lane, Wakefield, Mass. 01880

[21] Appl. No.: 953,601

[22] Filed: Oct. 23, 1978

Related U.S. Application Data

[62] Division of Ser. No. 914,335, Jun. 12, 1978, Pat. No. 4,143,161.

[51] Int. Cl.³ .............................................. A01G 5/06
[52] U.S. Cl. ........................................... 426/1; 43/4; 427/4
[58] Field of Search ................ 424/84; 426/1; 428/15; 119/1; 35/20; 43/4; 427/4; 428/326; 241/2

[56] References Cited

U.S. PATENT DOCUMENTS

| | | | |
|---|---|---|---|
| 2,452,553 | 11/1948 | Curtis et al. | 426/1 |
| 2,565,420 | 8/1951 | Ayers | 241/28 X |
| 2,735,215 | 2/1956 | Rutledge | 43/55 |
| 2,809,463 | 10/1957 | Buss | 43/55 |
| 3,322,544 | 5/1967 | Yakstis | 426/1 X |
| 3,428,459 | 2/1969 | Hinds | 426/1 |
| 3,499,420 | 3/1970 | Atwell | 119/1 |
| 3,528,816 | 9/1970 | Nagae | 426/1 X |
| 3,545,404 | 12/1970 | Loftus | 119/1 |
| 3,846,557 | 11/1974 | Mulla et al. | 426/1 |

FOREIGN PATENT DOCUMENTS

| | | | |
|---|---|---|---|
| 353286 | 7/1931 | United Kingdom | 426/1 |
| 652822 | 5/1951 | United Kingdom | 426/1 |

*Primary Examiner*—Shrive P. Beck
*Attorney, Agent, or Firm*—Wolf, Greenfield & Sacks

[57] ABSTRACT

A material used to coat earthworms or the like for facilitating the baiting of the earthworm onto a hook. The coating material comprises a wood flour of powdered wood preferably mixed with dehydrated ground worms, mussels, shrimp, clams and the like food products. The powdered wood is preferably made from hardwood such as maple or hard birch. The mixture may also be used as "chum" or for preventing the drying and breaking of sea worms.

4 Claims, No Drawings

MATERIAL FOR COATING BAIT

This is a division of application Ser. No. 914,335, filed June 12, 1978 now U.S. Pat. No. 4,143,161.

BACKGROUND AND SUMMARY OF THE INVENTION

The present invention relates to a means and method for coating live worms which may be earthworms, seaworms or the like.

A prior art search uncovered the following U.S. Pat. Nos. 2,749,647; 3,421,899; 3,545,404; 3,931,414; 3,953,934; 3,987,575 and 4,053,640. Some of these prior art patents such as Beloff disclose artificial lures which have their attraction to fish enhanced by the addition of fish-attracting substances. The Beloff patent shows an artificial lure having an open cavity containing a finely divided material such as lobster meat, soy bean, cotton seed oil, etc. The Morita patent and the Visser patent also show different materials that may be used in association with an artificial lure. The Takasugi and Popeil patents suggest the use of pulverized fish bait of various types of materials such as, for example, raw fish. These patents suggest the application of this material directly onto the hook. However, none of the prior art that was found suggest a mixture in accordance with the present invention and which is to be coated directly on a live earthworm or seaworm.

The patent to Loftus discloses the treatment of live worms but only for the purpose of making them irridescent. Again, this patent does not disclose nor suggest the principle of the present invention of coating live worms for facilitating ease in handling these worms for baiting them onto a hook.

In accordance with the present invention there is provided a material for coating bait which is preferably used for coating live bait to facilitate the handling of the bait to primarily make it easier to put the bait onto a hook. This material is preferably made from a powdered wood flour which is applied to the bait such as earthworms so as to make it easier to handle and hold the bait when it is being put onto a hook. It has been found that the baiting process is accomplished quite rapidly with the technique of this invention. Hooks can be baited as much as five times faster using the technique of this invention in contrast to the prior way of simply hooking the earthworm onto the hook. The wood flour is preferably made from a hardwood tree with the preferred hardwoods being maple and birch. It is also preferred that the wood flour be mixed with dehydrated ground food product such as powdered earthworms, mussels, shrimp, clams or the like. In accordance with the method of this invention it is practiced by applying the powdered wood flour to the bait to enhance the gripping of the bait. In the conventional method of baiting an earthworm, the earthworm is usually difficult to hold stationary, however, with the method of this invention by applying the powdered wood flour the bait can be handled much more easily. The powdered wood flour may be applied with the use of a shaker to shake the material on to the bait or it may be applied by dipping or rolling the bait in the material.

DESCRIPTION OF MATERIAL AND METHOD

The material of this invention is used preferably to coat earthworms or seaworms for the purpose of making it easier to bait these worms onto a hook. However, the material of this invention may also be used for coating other bait and especially wet bait that is difficult to handle such as clams, minnows, chubs, or fish eggs. The material of this invention is especially useful in association with trawl lines which may have as many as 300-500 hooks per line. It has been found that hooks can be baited as much as five times faster using the material and method of this invention in comparison with the prior technique of simply hooking a live wet earthworm onto a hook.

The material of this invention is in the form of a wood flour which is preferably from a hardwood variety of tree, preferably a maple powdered wood flour, although hard birch is also quite suitably. Other hard woods may be used but it is preferred that ones not be used that would discolor. Thus, oak is not as preferred as maple because it does tend to turn the color with aging. Ash may also be used, but again, this is not as preferred as maple or hard birch because ash is relatively light and tends to splinter. Hickory could be used but is not readily available. Some of the soft wood varieties could also be used but they are not as preferred as the maple or hard birch as trees such as fir and pine have oil tar and cannot be produced in as fine a powder as maple or hard birch. Thus, the preferred wood flour is one that is made from a wood that forms a relatively fine powder, that has no substantial oils therein, and that will not discolor with age. The preferred maple wood flour is advantageous also because it is inexpensive and is naturally light in weight, soft, and fluffy. Other more typical flours such as cornmeal are not as suitable because they tend to ball-up.

The preferred coating material of the present invention is non-abrasive and non-gritty and easily absorbs the mud, clay and other soil matter that may be on the worm or other bait. With the use of the flour of this invention the worm or other bait can be easily baited. An earthworm can be softly and gently inserted onto the hook without any substantial injury to the worm's skin. Thus, the baited worm will stay in a live or semi-live state for a longer period of time than with conventional baiting techniques.

Once the bait has been coated with the material of this invention, the material washes off the worm almost instantly upon entering the water. The material of this invention is not sticky, tacky or gummy and dusts off of the person's fingers quite easily. Also, the material floats away as it is a wood product. The material of this invention does not knead-up and does not stain anything that it comes in contact with. With the use of the material of this invention, cuts and scratches are prevented from sharp hooks which previously many times happened when applying a wet worm to a sharp hook.

Another advantage of the material of this invention is that it does not decompose or rot and even if the material is wet, it can be used.

The finely powdered wood flour of this invention is preferably also used in association with "chum" which is added to the flour so as to attract fish to the baited hook. The added material includes dehydrated ground food products such as powdered earthworms, mussels, shrimp, clams, or the like. The wood flour is thoroughly mixed with this dehydrated finely ground (powdered) food product. After the mixture is applied to the earthworm, it washes off of the baited hook once in the water and tends to spread out from the baited hook to attract fish to the area of the baited hook.

The powdered flour of this invention may be stored in a box or a shaker. The material may be shaked onto the bait. In mass production operations, the material may be mixed with a thousand worms or more at a time.

In addition to its use for assisting in baiting, the mixture of this invention may also be used to prevent seaworms from breaking up and drying. It may also be used to prevent drying up of other types of bait. Left over seaworms can be kept for many days under refrigeration with them being coated in accordance with the present invention. Earthworms coated with the wood flour of this invention but not used can be returned to the rearing box or garden without injury to the worm.

One feature of the present invention is that the wood flour does not require any preservatives to maintain it. Even if the material is kept over a relatively long period of time there will be no spoilage.

Another feature of the present invention is that the wood flour does not dissolve in water and thus does not become sticky or ball-up as a conventional flour would do.

When the wood flour of this invention is mixed with the "chum" it is preferred to have on the order of 25% by weight of the dehydrated food product with the remainder of the mixture being the wood flour of this invention.

What is claimed is:

1. A mixture for coating bait to improve the handling thereof, said mixture comprising a hardwood flour that forms a relatively fine, dry powder, is absent any substantial oil tar and maintains its color with aging, in combination with dehydrated ground food product, said dehydrated food product selected from the group consisting of powdered earthworms or shellfish, and said mixture having on the order of 25 percent by weight of dehydrated food product with the remainder of the mixture being the hardwood flour, said mixture after application to the bait adapted to dislodge from the bait with the food product performing a means for attracting the fish.

2. A material as set forth in claim 1 wherein the food product (may comprise powdered earthworms) consists of mussels, shrimps, or clams (or the like).

3. A material as set forth in claim 1 wherein the hardwood comprises maple.

4. A material as set forth in claim 1 wherein the hardwood comprises birch.

* * * * *